United States Patent
Wang He

(10) Patent No.: US 9,612,385 B2
(45) Date of Patent: Apr. 4, 2017

(54) METHOD FOR MAKING LIGHT GUIDE PLATE

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 487 days.

(21) Appl. No.: 14/283,176

(22) Filed: May 20, 2014

(65) Prior Publication Data

US 2014/0345116 A1 Nov. 27, 2014

(30) Foreign Application Priority Data

May 21, 2013 (TW) .............................. 102117967 A

(51) Int. Cl.
*F21V 9/00* (2015.01)
*G02B 6/00* (2006.01)
*F21V 8/00* (2006.01)

(52) U.S. Cl.
CPC ......... *G02B 6/0043* (2013.01); *G02B 6/0065* (2013.01); *Y10T 29/49* (2015.01)

(58) Field of Classification Search
CPC .... G02B 6/0043; G02B 6/0065; G02B 6/004; Y10T 29/49; Y10T 29/49764
See application file for complete search history.

(56) References Cited

U.S. PATENT DOCUMENTS

| | | | | |
|---|---|---|---|---|
| 2011/0103094 A1* | 5/2011 | Nagata | ................. | G02B 6/0068 362/613 |
| 2011/0176327 A1* | 7/2011 | Iwasaki | ................ | G02B 6/0043 362/606 |
| 2012/0026429 A1* | 2/2012 | Chen | ..................... | G02B 6/004 349/65 |

\* cited by examiner

*Primary Examiner* — David Bryant
*Assistant Examiner* — Jun Yoo
(74) *Attorney, Agent, or Firm* — Zhigang Ma

(57) ABSTRACT

A method includes having test plate and light source, the test plate having matrix of first pattern-dots and equally divided into blocks. Intersecting surfaces between the first pattern-dots and the first bottom surface have the same radius $r_x$. Detecting a luminous flux $\Phi_x$ of each block and a total luminous flux $\Phi_t$ of the test plate when light source is activated; calculating an average luminous flux $\Phi_{ave}$; calculating the radius $r_{x1}$ of the first pattern-dots in each block assuming that an actual luminous flux of each block is equal to the average luminous flux according to the formula $r_{x1}=r_x \times \mathrm{sqrt}\,(\Phi_{ave}/\Phi_x)$. Providing a substrate having the same structure as the base and the substrate being divided into blocks according to the same principle as the test plate. Forming second pattern-dots having the same arrangements as the first pattern-dots and having radius of $r_{x1}$ in each block.

4 Claims, 5 Drawing Sheets

METHOD FOR MAKING LIGHT GUIDE PLATE

FIELD

The subject matter herein generally relates to a method for making a light guide plate.

BACKGROUND

A light guide plate is a key component of a back light system used in a liquid crystal display (LCD). The light guide plate converts a point light source or a linear light source into a surface light source to illuminate a liquid crystal panel of the liquid crystal display. Generally, the light guide plate needs a number of pattern-dots on a bottom surface thereof, in order to disable partially total internal reflection of light beams and to provide more uniform brightness.

BRIEF DESCRIPTION OF THE DRAWINGS

Implementations of the present technology will be described, by way of example only, with reference to the attached figures, wherein.

DETAILED DESCRIPTION

Figure 1:
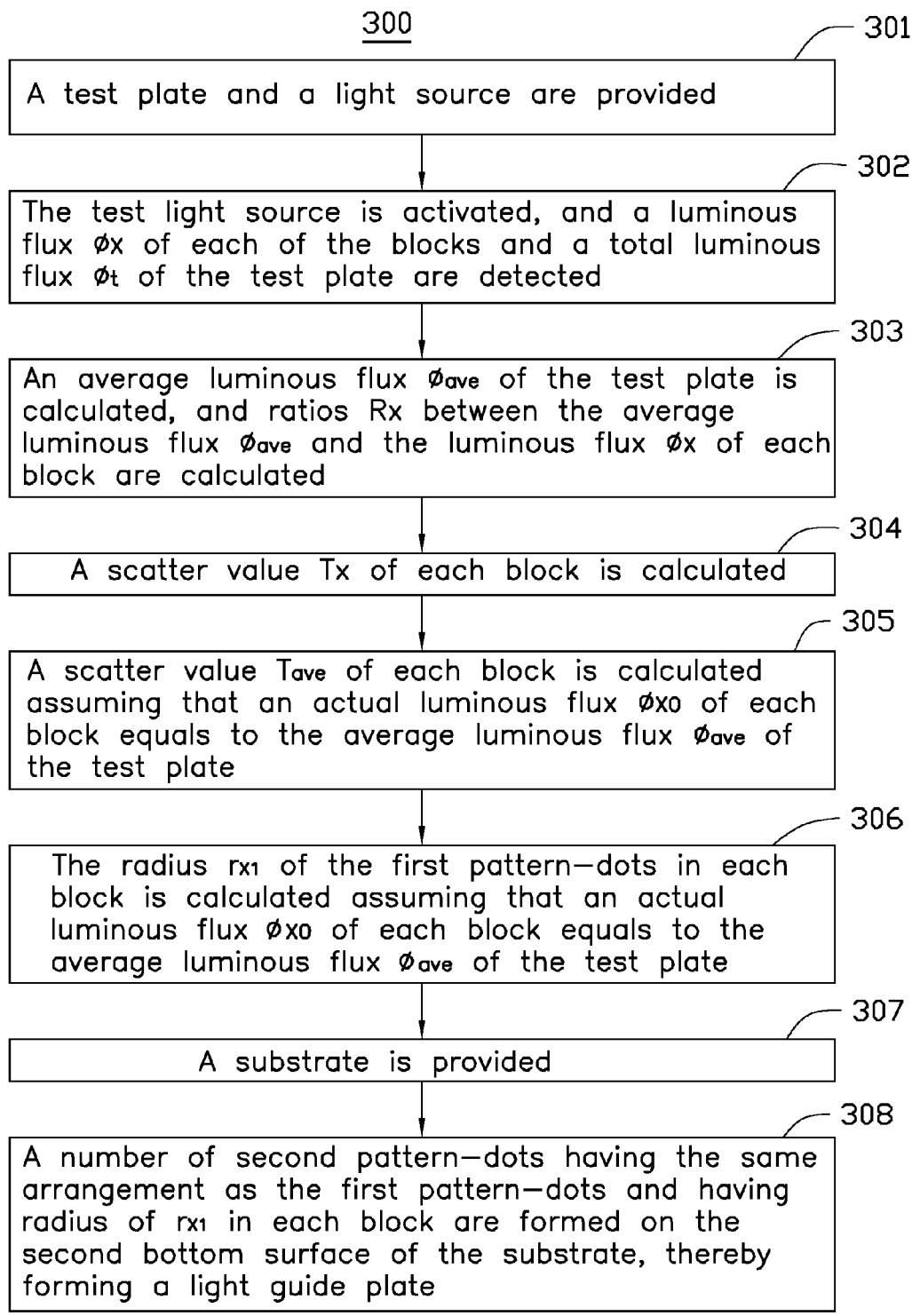
FIG. 1 is a flowchart of an example embodiment of a method for making a light guide plate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like.

A method for making a light guide plate includes: providing a test plate and a light source, the test plate including a base and a number of first pattern-dots, the base comprising a first bottom surface, a first light output surface opposite to the first bottom surface, and a first light incident surface interconnected between the first bottom surface and the first light output surface. The first pattern-dots are arranged on the first bottom surface in a matrix and equally divided into a number of blocks. Intersecting surfaces between the first pattern-dots and the first bottom surface having the same radius $r_X$, where X represents a code of each block (X=A, B, C, D, E, F . . . ), the line spacing of the first pattern-dots in each block being equal to the column spacing of the first pattern-dots in the same block. When the light source is activated, a luminous flux $\phi_X$ of each of the blocks and a total luminous flux $\phi_t$ of the test plate is detected. An average luminous flux $\phi_{ave}$ is calculated according to the formula: $\phi_{ave}=\phi_t/n$, wherein n represents the number of the blocks and n>2. The radius $r_{X1}$ of the first pattern-dots in each block is calculated assuming that an actual luminous flux $\phi_{X0}$ of each block equals the average luminous flux $\phi_{ave}$ of the test plate according to the formula:

$$r_{X1} = r_X \sqrt{\frac{\phi_{ave}}{\phi_X}}.$$

A substrate is provided, the substrate having the same structure as the base and divided into the same number of blocks according to the same principle as the test plate. A number of second pattern-dots are formed having the same arrangement as the first pattern-dots and having a radius of $r_{X1}$ in each block on a second bottom surface of the substrate. The light guide plate is thereby formed.

FIG. 1 shows a flowchart presented in accordance with an example embodiment. The example method 300 for making a light guide plate 210 (shown in FIG. 4) is provided by way of an example, as there are a variety of ways to carry out the method. The method 300 described below can be carried out using the configurations illustrated in FIGS. 1 and 2, for example, and various elements of these figures are referenced in explaining example method 300. Each block shown in FIG. 1 represents one or more processes, methods or subroutines, carried out in the exemplary method 300. Additionally, the illustrated order of blocks is by example only and the order of the blocks can change according to the present disclosure. The exemplary method 300 can begin at block 301.

At block 301, a test plate and a light source are provided.

Figure 2:
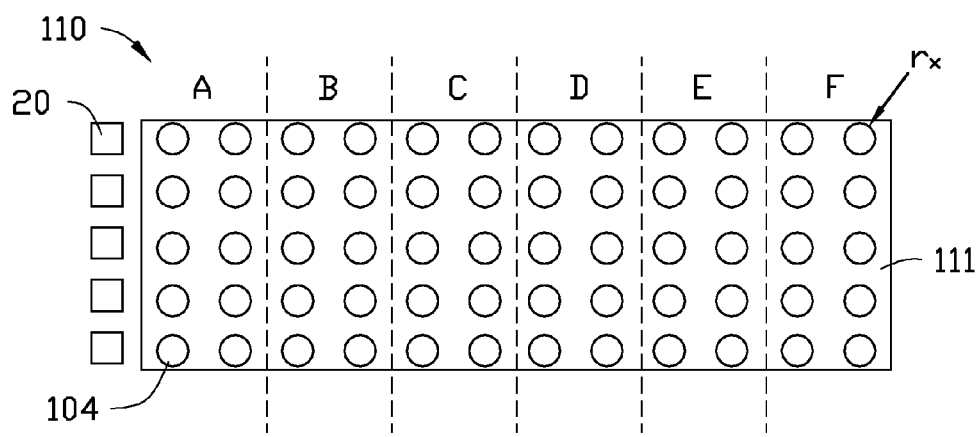
FIG. 2 is a bottom view of a test plate and a light source.
Figure 3:
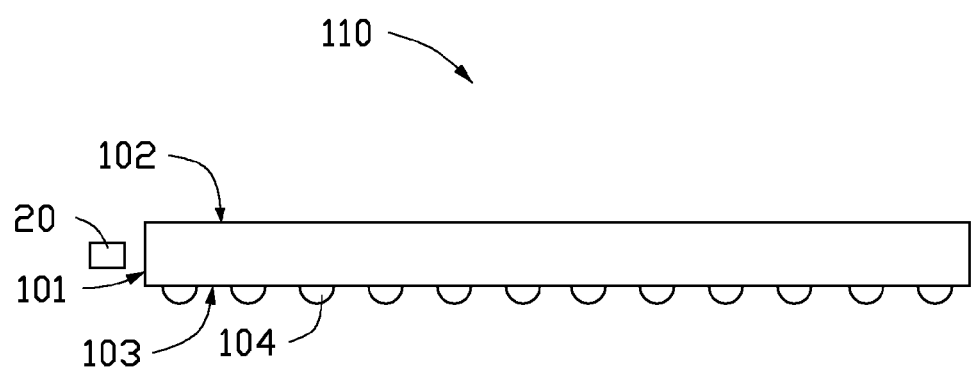
FIG. 3 is a front view of the test plate and the light source of FIG. 2.

Referring to FIGS. 2 and 3, the test plate 110 includes a planar base 111 and a number of first pattern-dots 104. The base 111 includes a first light incident surface 101, a first light output surface 102, and a first bottom surface 103. The first light output surface 102 and the first bottom surface 103 are positioned at opposite sides of the base 111. The first light incident surface 101 is interconnected between the first light output surface 102 and the first bottom surface 103. The first pattern-dots 104 are formed on the first bottom surface 103 and are substantially arranged in a matrix. Each column of the first pattern-dots 104 is substantially parallel to the first light incident surface 101. The first pattern-dots 104 have the same shape, the same structures, the same dimensions, the same line spacing, and the same column spacing. The line spacing of the first pattern-dots 104 in each block is equal to the column spacing of the first pattern-dots 104 in the same block. The test plate 110 is equally divided into a number of blocks along a lengthwise direction of the test plate 110. Each block has the same number of columns of first pattern-dots 104.

In this embodiment, the first pattern-dots 104 are arranged in a 5×12 matrix. The line spacing of the first pattern-dots 104 is equal to the column spacing of the first pattern-dots 104. The line spacing of the first pattern-dots 104 is about 1 millimeter, and the column spacing of the first pattern-dots 104 is about 1 millimeter. Each of the first pattern-dots 104 is substantially hemispherical, and radius $r_X$ of each of the first pattern-dots 104 is about 0.3 millimeters. The test plate 110 is equally divided into six blocks, such as block A, block B, block C, block D, block E, and block F. Each block has the same width along the lengthwise direction of the test plate 110 and has two columns of the first pattern-dots 104.

The light source 20 is positioned outside the test plate 110 and adjacent to the first light incident surface 101. In detail, the light source 20 is aligned with the first light incident surface 101.

At block 302, the light source 20 is activated, and a luminous flux $\phi_X$ of each of the blocks and a total luminous flux $\phi_t$ of the test plate 110 are detected. X here represents a code of each of the blocks, such as A, B, C, D, E, and F. For example, $\phi_A$, $\phi_B$, $\phi_C$, $\phi_D$, $\phi_E$ and $\phi_F$ respectively represent the luminous fluxes of the six blocks. The uniformity of light emitting from the first light output surface 102 is about 55.9%.

At block 303, an average luminous flux $\phi_{ave}$ of the test plate 110 is calculated, and ratios $R_X$ between the average luminous flux $\phi_{ave}$ and the luminous flux $\phi_X$ of each block are calculated. In detail, the average luminous flux satisfies the following formula: $\phi_{ave}=\phi_t/n$ (n represents the number of the blocks, and n>2). The ratio $R_X$ satisfies the following formula (formula 1): $R_X=\phi_{ave}/\phi_X$.

At block 304, a scatter value $T_X$ of each block is calculated. In detail, the scatter value $T_X$ satisfies the following formula (formula 2): $T_X=f_1 \times P_X$, wherein $P_X$ is a density of the first pattern-dots 104 in each block, and $f_1$ is a bidirectional scattering distribution function (BSDF) of the test plate 110. The density $P_X$ of the first pattern-dots 104 satisfies the following formula (formula 3): $P_X=S_{dot(X)}/S_X$, wherein $S_X$ is a dimension of each block, and $S_{dot(X)}$ is a dimension of a intersecting surface between the first pattern-dots 104 and the first bottom surface 103 in each block. The value of the bidirectional scattering distribution function depends on the roughness and the density of the test plate 110.

At block 305, a scatter value $T_{ave}$ of each block is calculated assuming that an actual luminous flux $\phi_{X0}$ of each block equals to the average luminous flux $\phi_{ave}$ of the test plate 110. In this situation, the scatter value $T_{ave}$ satisfies both the formula (formula 4): $T_{ave}=T_X \times R_X$ and the formula (formula 5): $T_{ave}=f_1 \times P_{X1}$. $P_{X1}$ is a density of the first pattern-dots 104 in each block assuming that an actual luminous flux $\phi_{X0}$ of each block equals the average luminous flux $\phi_{ave}$ of the test plate 110. In detail, the density of the first pattern-dots 104 $P_{X1}$ satisfies the following formula (formula 6): $P_{X1}=S_{dot(X1)}/S_X$, wherein $S_{dot(X1)}$ is a dimension of a intersecting surface between the first pattern-dots 104 and the first bottom surface 103 in each block assuming that an actual luminous flux $\phi_{X0}$ of each block equals the average luminous flux $\phi_{ave}$ of the test plate 110.

At block 306, the radius $r_{X1}$ of the first pattern-dots 104 in each block is calculated assuming that an actual luminous flux $\phi_{X0}$ of each block equals to the average luminous flux $\phi_{ave}$ of the test plate 110. In detail, first, $T_X \times R_X=f_1 \times P_{X1}$ is derived according to the formulas 4 and 5. Second, $f_1 \times P_X \times R_X=f_1 \times P_{X1}$ is derived according to the formula 2. Third, $S_{dot(X)}R_X/S_X=S_{dot(X1)}/S_X$ is derived according to the formulas 3 and 6. Fourth, $\pi r_X^2 \phi_{ave}/\phi_X=\pi r_{X1}^2$ is derived according to the formula 1. That is, $$r_{X1} = r_X \sqrt{\frac{\phi_{ave}}{\phi_X}}.$$

Figure 4:
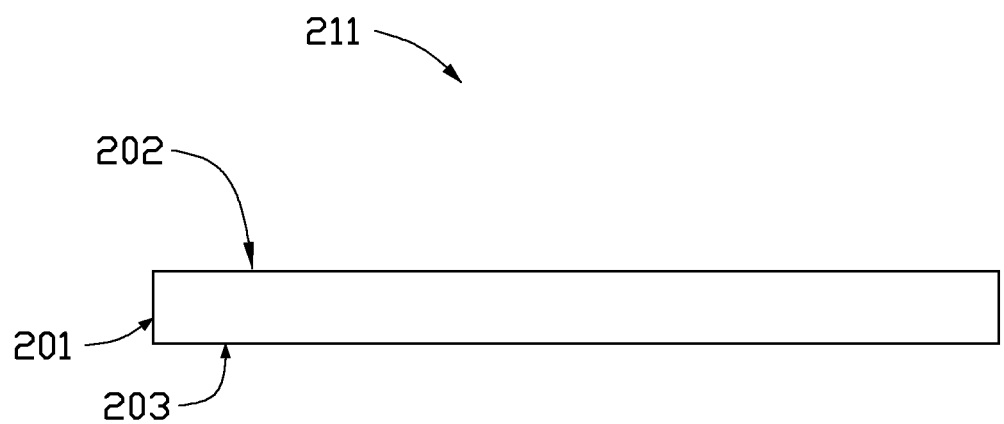
FIG. 4 is a front view of a substrate of the light guide plate.
Figure 5:
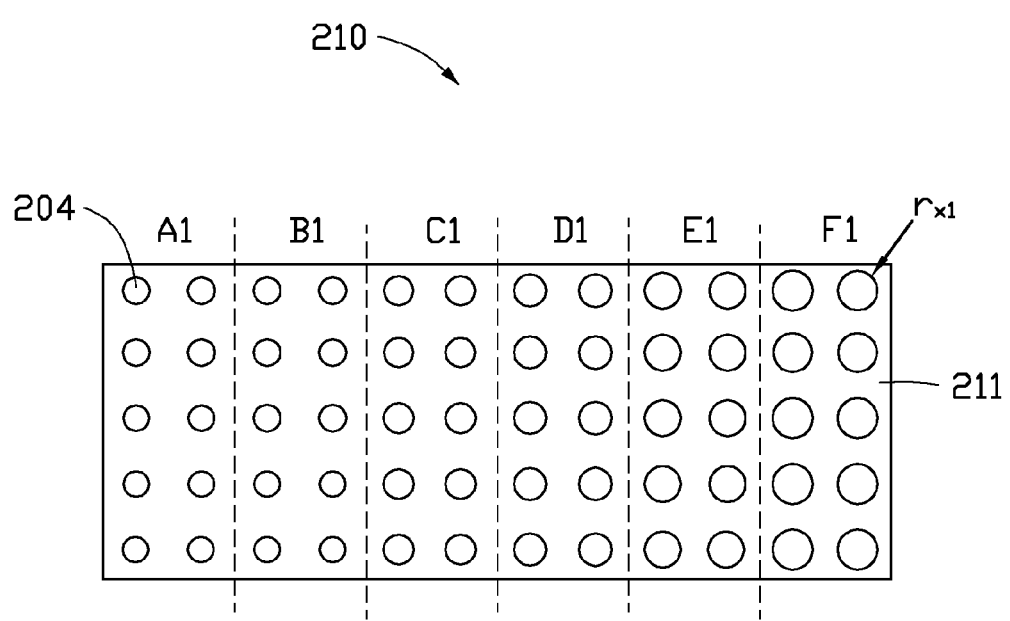
FIG. 5 is a bottom view of the light guide plate of FIG. 4.

At block 307, a substrate is provided. Referring to FIG. 4, the substrate 211 has the same structure, the same shape, the dimensions, and the same material as the base 111. In detail, the substrate 211 includes a second light incident surface 201, a second light output surface 202, and a second bottom surface 203. The second light output surface 202 and the second bottom surface 203 are positioned at opposite sides of the substrate 211. The second light incident surface 201 is interconnected between the second light output surface 202 and the second bottom surface 203. The substrate 211 is equally divided into six blocks along a lengthwise direction of the substrate 211 according to the same principle as the test plate 110, such as block A1, block B1, block C1, block D1, block E1, and block F1 (shown in FIG. 5).

At block 308, a number of second pattern-dots 204 having the same arrangement as the first pattern-dots 104 and having a radius of $r_{X1}$ in each block are formed on the second bottom surface 203 of the substrate 211, thereby forming a light guide plate 210. In detail, the second pattern-dots 204 are arranged in a 5×12 matrix. The line spacing in each block is equal to the column spacing in the same block. The block A1 has a radius $$r_{A1} = r_A \sqrt{\frac{\phi_{ave}}{\phi_A}}.$$

The block B1 has a radius $$r_{B1} = r_B \sqrt{\frac{\phi_{ave}}{\phi_B}}.$$

The block C1 has a radius $$r_{C1} = r_C \sqrt{\frac{\phi_{ave}}{\phi_C}}.$$

The block D1 has a radius $$r_{D1} = r_D \sqrt{\frac{\phi_{ave}}{\phi_D}}.$$

The block E1 has a radius $$r_{E1} = r_E \sqrt{\frac{\phi_{ave}}{\phi_E}}.$$

The block F1 has a radius $$r_{F1} = r_F \sqrt{\frac{\phi_{ave}}{\phi_F}}.$$

The uniformity of light emitting from the second light output surface 202 is about 81.8%.

The embodiments shown and described above are only examples. Many details are often found in the art such as the other features of a method for making a light guide plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for making a light guide plate comprising:
   providing a test plate and a light source, the test plate comprising a base and a plurality of first pattern-dots, the base comprising a first bottom surface, a first light output surface opposite to the first bottom surface, and a first light incident surface interconnected between the first bottom surface and the first light output surface, the first pattern-dots arranged on the first bottom surface in a matrix and equally divided into a number of blocks, intersecting surfaces between the first pattern-dots and the first bottom surface having the same radius $r_X$, X representing a code of each block (X=A, B, C, D, E, F . . . ), the line spacing of the first pattern-dots in each block being equal to the column spacing of the first pattern-dots in the same block;
   activating the light source and detecting a luminous flux $\phi_X$ of each of the blocks and a total luminous flux $\phi_t$ of the test plate;
   calculating an average luminous flux $\phi_{ave}$ according to the formula: $\phi_{ave}=\phi_t/n$, wherein n represents the number of the blocks and n>2; and
   calculating the radius $r_{X1}$ of the first pattern-dots in each block assuming that an actual luminous flux $\phi_{X0}$ of each block equals to the average luminous flux $\phi_{ave}$ of the test plate according to the formula:

$$r_{X1} = r_X \sqrt{\frac{\phi_{ave}}{\phi_X}};$$

providing a substrate, the substrate having the same structure as the base and divided into the same number of blocks according to the same principle as the test plate; and
   forming a number of second pattern-dots having the same arrangement as the first pattern-dots and having radius of $r_{X1}$ in each block on a second bottom surface of the substrate, thereby forming the light guide plate.

2. The method of claim 1, wherein the first pattern-dots are arranged in a 5×12 matrix.

3. The method of claim 1, wherein each of the first pattern-dots is substantially hemispherical.

4. The method of claim 1, wherein radius $r_X$ of each of the first pattern-dots is about 0.3 millimeters.

* * * * *